April 8, 1952     O. HAMMER     2,592,277
BEARING FOR GAUGE CUTTERS OF ROTARY ROCK BITS
Filed May 15, 1948
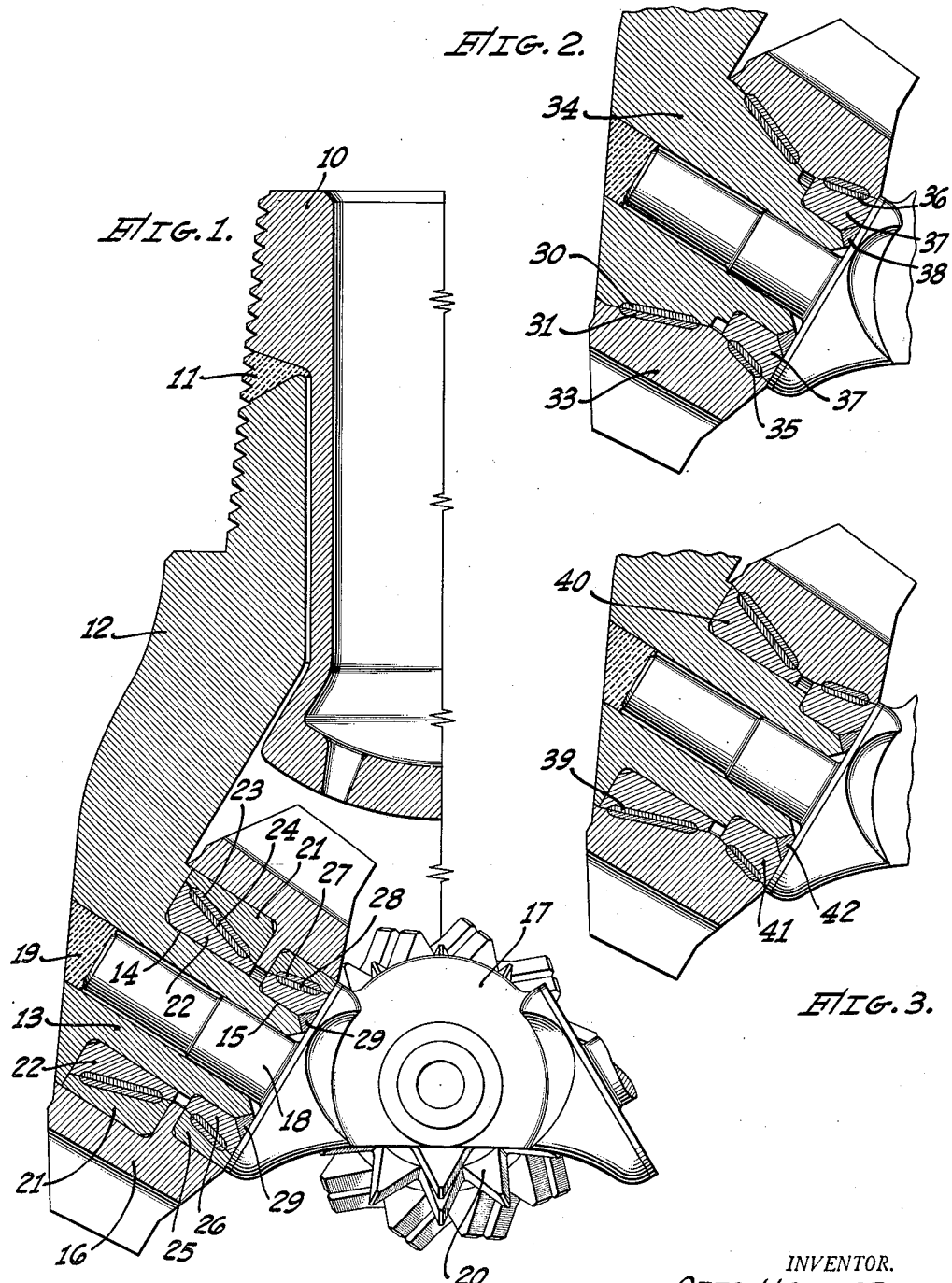
INVENTOR.
OTTO HAMMER
BY
ATTORNEYS.

Patented Apr. 8, 1952

2,592,277

UNITED STATES PATENT OFFICE 2,592,277

BEARING FOR GAUGE CUTTERS OF ROTARY ROCK BITS

Otto Hammer, Whittier, Calif., assignor to Security Engineering Co., Inc., Whittier, Calif., a corporation of California Application May 15, 1948, Serial No. 27,245

3 Claims. (Cl. 255—71)

This invention relates to bearings for outer or gauge cutters on rotary rock bits of the so-called cross-section type.

A primary object of the invention is to provide a bearing for the outer or gauge cutter of a rotary rock bit which is capable of carrying greater loads than the conventional roller and ball bearings used for such cutters.

More specifically, an object of the invention is to provide a relatively simple and inexpensive bearing which may function as a combined radial bearing and a thrust bearing capable of carrying not only outer thrusts imposed on the cutter but also include thrusts which are frequently imposed when the gauge cutting corners of the cutter teeth become rounded or dubbed off in the course of wear. Recent technological advances in well drilling practice require the imposition of extremely heavy weights on the bit such as, for example, 50,000 pounds on an 8¾" bit. When such weights are imposed the drill stem cannot be rotated at a high rate because of the danger of bearing failure when roller and ball bearings are employed.

An object of the present invention is to provide an improved bearing of the friction type wherein the opposed surfaces of the bearing are formed of hard metals and are so arranged as to provide not only strong radial bearings but thrust bearings to carry outward and inward thrusts that may be imposed on the cutter.

Another object of the invention is to provide a bearing for rock bit cutters having the above mentioned characteristics which can be easily and economically manufactured and readily assembled with the cutter and installed.

With the foregoing and other objects in view, which will be made manifest in the following detailed description and specifically pointed out in the appended claims, reference is had to the accompanying drawings for an illustrative embodiment of the invention, wherein:

Figure 1 is a half section through a cross-section bit and through the outer or gauge cutter thereof illustrating the bearings embodying the present invention as having been incorporated therein;

Fig. 2 is a partial view in vertical section through the gauge cutter of a rotary rock bit illustrating a slightly modified form of construction; and Fig. 3 is a similar view to Fig. 2 and illustrating another alternative form of construction.

Referring to the accompanying drawings wherein similar reference characters designate similar parts throughout, 10 indicates the body of a bit to which legs may be secured such as by weld metal 11. One of such legs is indicated at 12 and has a hollow journal 13 integral therewith. This journal, in the preferred form of construction, is externally stepped providing an outer portion 14 that is of somewhat larger diameter than the inner portion 15. The gauge cutter of the cross-section bit illustrated as shown at 16 and the bridge 17, conventionally employed in cross-section rock bits, has integral therewith a pin 18 which extends into the central aperture in the journal and is anchored therein such as by weld metal 19. An inner cutter for the cross-section bit is indicated at 20.

In the construction illustrated in Fig. 1, the bearings are provided by what may be regarded as inner and outer opposed pairs of bushings or rings. The bushings or rings of the outer bearing are indicated at 21 and 22. These rings have their opposed surfaces grooved and filled with hard metal indicated at 23 and 24. In a similar manner the inner bearing is composed of rings or bushings 25 and 26 which are grooved and filled with hard metal indicated at 27 and 28. The hard metals employed are of the type usually employed for hard surfacing such as Stellite or Stoodite and should have a hardness of approximately 50 to 60 on the C scale of the Rockwell hardness test machine. The compositions of the opposed hard metals preferably are dissimilar so as to conform to good bearing practice to prevent galling. These hard metals are deposited in their respective grooves as by welding so that in effect they become integral with their respective rings or bushings. The opposed faces of the hard metals and of the rings or bushings of the outer bearing are beveled or are inclined inwardly toward the axis of the journal. In a similar manner the opposed faces of the hard metals and of the rings or bushings of the inner bearing are beveled or inclined outwardly toward the axis of the journal. Consequently the outer bearing functions as a radial bearing and as a thrust bearing for carrying outward thrusts imposed on the cutter 16. In a similar manner the inner bearing functions not only as a radial bearing but as a thrust bearing carrying inward thrusts that may be imposed on the cutter 16 when the gauge cutting corners of the teeth on the cutter become rounded or are dubbed off.

In the preferred form of construction the inner ring or bushing 21 of the outer radial bearing can be pressed or shrunk onto the journal so as to in effect become integral therewith and in a similar manner the outer ring or bushing 22 of the outer bearing may be pressed into the cutter 16 so as to in effect become integral therewith. The inner ring or bushing 25 can also be pressed into the cutter but the inner ring or bushing 26 is inserted after the cutter has been slipped onto the journal and may be anchored in position such as by weld metal 29 prior to the assembly of the leg 12 with the bridge 17.

From the above described construction it will be appreciated that no space within the cutter is wasted to provide room for inner and outer thrust bearings which are independent of the radial bearings. The two bearings used function as radial bearings and thrust bearings combined wherein the outer bearing assumes outer thrust loads and the inner bearing assumes inner thrust loads applied to the cutter.

In the construction illustrated in Fig. 2, the arrangement of the bearings is substantially the same except that the hard metals 30 and 31 of the outer radial bearing are deposited in grooves that are formed directly in the cutter 33 and on the tapered surface of the journal 34. The hard metal 35 of the inner bearing can also be deposited in a groove directly on the interior of the cutter but the hard metal 36 is deposited on a ring or bushing 37 similar to the ring or bushing 26 which can be anchored in position by means of weld metal 38. In this form of construction the bearings are likewise superior as radial bearings to the conventional roller bearing in that although they are of the friction type they are capable of carrying the heavy loads under high speeds required by the recent developments in well drilling practice. The outer bearing by reason of its inclination to the axis of the journal functions not only as a radial bearing but as a thrust bearing for outer thrusts and the inner bearing similarly functions as a radial bearing and as a thrust bearing for inner thrusts.

The construction illustrated in Fig. 3 is substantially the same as that illustrated in Fig. 2 except that the hard metal 39 of the outer bearing is deposited in a groove in a ring or bushing 40 in a manner similar to the manner in which the ring or bushing 21 is constructed. In this form of construction the hard metals applied to the interior of the cutter are welded directly thereto within grooves. The cutter and journal are readily assembled prior to the assembly of the leg with the bridge and in so doing the ring or bushing 41 of the inner bearing is applied at the completion of the assembly of the cutter with the leg and welded to the journal such as by weld metal 42.

From the above described construction it will be appreciated that an improved bearing is provided for the outer or gauge cutters of cross-section type bits which occupies a minimum amount of space within the cutter and by reason of its construction can assume the required radial loads and inner as well as outer thrust loads.

Various changes may be made in the details of construction without departing from the spirit and scope of the invention as defined by the appended claims.

I claim:

1. A rotary rock bit having hollow journals for the gauge cutters thereof, a bridge between the journals having pins extending outwardly therein and welded therein, bushings telescoped onto the inner ends of the journals and welded thereon in positions in abutting relationship to the bridge, said bushings presenting outwardly tapering external surfaces circumferentially grooved and the grooves being filled with welded-on hard metal, the journals outwardly of the bushings presenting inwardly tapering external surfaces circumferentially grooved and the last-mentioned grooves being filled with welded-on hard metal, cutters rotatable about the journals presenting internal surfaces complementary to said tapered surfaces and which are circumferentially grooved, the grooves in the cutters being filled with welded-on hard metal arranged in opposition to the hard metal on the bushings and on the journals.

2. A rotary rock bit having hollow journals for the gauge cutters thereof, a bridge between the journals having pins extending outwardly in the journals and welded therein, rings telescoped onto the outer ends of the journals presenting inwardly tapering external surfaces which are circumferentially grooved and the grooves filled with welded-on hard metal, bushings telescoped onto the inner ends of the journals and welded thereon in positions in abutting relationship to the bridge, said bushings presenting outwardly tapering external surfaces which are circumferentially grooved and the grooves thereof being filled with welded-on hard metal, cutters rotatable upon the journals presenting internal surfaces complementary to the tapered surfaces on the rings and bushings and which are circumferentially grooved and which have the grooves thereof filled with welded-on hard metal arranged in opposition to the hard metal on the rings and bushings.

3. A rotary rock bit having hollow journals for the gauge cutters thereof, a bridge between the journals having pins extending outwardly in the journals and welded therein, rings telescoped onto the outer ends of the journals presenting inwardly tapering external surfaces which are circumferentially grooved and the grooves filled with welded-on hard metal, bushings telescoped onto the inner ends of the journals and welded thereon in positions in abutting relationship to the bridge, said bushings presenting outwardly tapering external surfaces which are circumferentially grooved and the grooves thereof being filled with welded-on hard metal, cutters rotatable about the journals having rings recessed therein and arranged in opposition to the mentioned rings and bushings, the rings on the cutters presenting outwardly and inwardly tapered surfaces complementary to the tapered surfaces on the rings and bushings respectively and which are circumferentially grooved and which have the grooves thereof filled with welded-on hard metal arranged in opposition to the hard metal on the rings and bushings respectively on the journals.

OTTO HAMMER.

REFERENCES CITED

The following references are of record in the file of this patent:

UNITED STATES PATENTS

| Number | Name | Date |
|---|---|---|
| Re. 21,628 | Reed | Nov. 19, 1940 |
| 1,306,694 | Hughes | June 17, 1919 |
| 1,657,501 | Gregory | Jan. 31, 1928 |
| 1,747,394 | Scott | Feb. 18, 1930 |
| 2,047,114 | Reed | July 7, 1936 |
| 2,147,927 | Scott | Feb. 21, 1939 |
| 2,171,057 | Crum | Aug. 29, 1939 |
| 2,234,198 | Reed | Mar. 11, 1941 |
| 2,507,776 | Francis | May 16, 1950 |

FOREIGN PATENTS

| Number | Country | Date |
|---|---|---|
| 474,698 | Germany | Apr. 6, 1929 |